United States Patent [19]
Cameron et al.

[11] Patent Number: 5,679,290
[45] Date of Patent: Oct. 21, 1997

[54] PACKED ABSORPTION TOWERS

[76] Inventors: Gordon M. Cameron, 4 Wellesbourne Crescent, Willowdale M2H 1Y7; Dahya Bhaga, 20 Hood Crescent, Scarborough, Ontario M1W 3C1, both of Canada

[21] Appl. No.: 714,370

[22] Filed: Sep. 16, 1996

[51] Int. Cl.⁶ ..................................... B01F 3/04
[52] U.S. Cl. ................... 261/96; 261/98; 261/DIG. 72
[58] Field of Search ................... 261/96, 98, DIG. 72, 261/94

[56] References Cited

U.S. PATENT DOCUMENTS

| | | | |
|---|---|---|---|
| 2,271,671 | 2/1942 | Wible | 261/96 |
| 3,685,971 | 8/1972 | Carson | 261/98 |
| 3,880,961 | 4/1975 | Alcock | 261/96 |
| 4,333,894 | 6/1982 | Hoppe et al. | 261/96 |
| 4,472,325 | 9/1984 | Robbins | 261/96 |

*Primary Examiner*—Tim R. Miles
*Attorney, Agent, or Firm*—Cushman Darby & Cushman IP Group Pillsbury Madison & Sutro LLP

[57] ABSTRACT

An improved packed tower for effecting the absorption of a gas into a liquid, comprising a cylindrical tower wall defining a packing zone; a plurality of packing pieces contained within the packing zone; a liquid distributor above the packing zone for distributing liquid onto the packing pieces; a gas feed inlet below the packing pieces for feeding gas through the packing zone, the improvement wherein the plurality of packing pieces comprises a first plurality of packing pieces, of a first packing piece size, disposed within a first region of the packing zone defining an annulus adjacent at an upper part of the tower wall, and a second plurality of packing pieces of a second packing piece size greater than the first packing piece size, within a second region of the packing zone. The packed tower provides higher efficiencies in gas absorption over prior art towers as to offer reduced tower and/or packing heights.

5 Claims, 1 Drawing Sheet

PACKED ABSORPTION TOWERS

FIELD OF THE INVENTION

This invention relates to packed absorption towers to provide contact between a liquid and a gas for effective mass and heat transfer, particularly, said towers for use in providing contact between sulfuric acid and air or gases containing sulfur trioxide in absorption or drying towers, in the manufacture of sulfuric acid by the contact process.

BACKGROUND TO THE INVENTION

Packed towers constitute major pieces of apparatus in many chemical manufacturing plants, particularly in the manufacture of sulfuric acid by the contact process. In the contact process, packed towers are used in the absorption of sulfur trioxide into sulfuric acid and the drying of air with sulfuric acid. The towers have, invariably, cylindrical walls, heights ranging from 30–60 feet, and diameters of 3–30 feet. The towers are packed with pieces of packing across the full tower width to a height of about 6–16 feet. Gas is forced up through the packing from the base of the tower, while meeting in countercurrent flow acid distributed over the top of the packing.

Classically, the vertical, cylindrical towers are packed with random or stacked packing pieces in which the dimensions of the packing pieces, at all levels in the tower is the same and no distinction is made between packing density at the centre of the tower and packing adjacent the tower wall.

The effect of gas and liquid maldistribution across the tower in terms of its effect on tower absorption performance is recognized in the art. Gas maldistribution has been related to uneven inlet gas momentum, while liquid maldistribution has been related to poor or out-of-level distributors. While these factors are useful in providing some understanding of such maldistribution, they ignore several characteristics of the way random packing is contained in vertical cylindrical towers and the negative effects such containment has on gas and liquid distribution.

Theoretically, the volume of packing held by a tower is fixed by the diameter and height of the bed of packing. The actual number of pieces per unit volume, however, varies as the region of the tower adjacent the tower wall has a lower packing density due to edge effects. This difference in packing density is addressed by tower packing manufacturers as adjustment to the volume of packing needed as a function of the ratio of tower diameter to packing piece size. This correction may easily attain a ten percent difference between a small and a large tower. The region adjacent the wall of a tower has fewer pieces of packing in a given volume than has the central core region of the tower. The pressure drop in a packed bed, in the absence of other factors, varies inversely as the third power of the void fraction, i.e. the fraction of packing bed volume not occupied by the packing pieces. Areas of high void fraction are, therefore, areas in which gas pressure losses are lower than average and, accordingly, areas where gas flow is likely to exceed the average.

An important space in cylindrical towers is the region adjacent the shell, where the presence of the wall results in a decrease in packing density and creates a preferential gas flow path. When liquid is uniformly distributed across the packing, the wall is a location where the liquid-to-gas ratio is likely to decrease below the average across the tower and, thus, adversely affect performance.

There is a further adverse effect caused by the wall creating a discontinuity. The liquid that flows down through the packing and which comes in contact with the wall, normally tends to run down the wall, unless wall wipers or other redistributors are present. As the liquid descends, the packing region adjacent the wall, therefore, becomes denuded to some degree, of the liquid needed for efficient mass transfer for which the tower was designed. The lower specific liquid flow has an associated lower gas flow resistance and, thus, enhances the possibility of gas maldistribution.

Corrective actions to improve tower absorption efficiency performance, to-date, are limited. One such technique is to split the packing up horizontally with liquid redistributors. A second technique is to install "wall wipers" to redirect the wall liquid flow back into the packing. The first alternative is, however, very expensive, especially on large diameter towers, as it introduces a need for an additional full-diameter packing support as well as a new liquid collector and redistributor. The second alternative results in a projection at the wall which can act as an anchor point for packing and allow a void to form below the wiper as the packing settles. Both corrections do not directly address the problem of wall effects on packed tower performance. A third and normal practice is the use of a significantly deeper, packed bed. However, the extra cost and pressure lost are most unfavourable.

For the reasons presented, hereinabove, the region next to the wall is a region of low flow resistance, lower than average mass transfer surface, and probably of lower than average liquid flow. It is also an area of higher than average gas velocity. Thus, for improved tower performance, all of these issues still need to be addressed by the art.

A first solution to this maldistribution problem is the use of a second tower packing size with a greater surface area per unit volume and smaller size than the basic packing used in the tower. Such packings have been used in layers in the top of the tower across the whole diameter as a means of increasing the mass transfer surface in a given volume and taking advantage of the normally lighter loading at the top of the tower as compared to the bottom of the tower. However, this distinct packing layer does not address the problem of maldistribution.

There, thus, remains a need to provide a packed tower having improved gas and liquid distribution characteristics to provide more efficient gas absorption without increasing the size or cost of the tower or packing bed.

SUMMARY OF THE INVENTION

This invention concerns ways of improving the efficacy of packing in absorption towers so that more uniform performance can be obtained across the tower from the centre to the edge.

It is, thus, an object of the present invention to provide an improved packed tower which provides uniform gas/liquid absorption performance across the full width of the tower.

Accordingly, in one aspect, the invention provides an improved packed tower for effecting the absorption of a gas into a liquid, comprising a cylindrical tower wall defining a packing zone; a plurality of packing pieces contained within said packing zone; a liquid distributor above said packing zone for distributing liquid onto said packing pieces; gas feed means below said packing pieces for feeding gas through said packing zone, the improvement wherein said plurality of packing pieces comprises a first plurality of packing pieces having a first packing piece size, disposed within a space of said packing zone defining an annulus adjacent at an upper part of said tower wall, and a second plurality of packing pieces of a second packing piece size greater than said first packing piece size within said packing zone.

The towers, according to the invention, thus, provide means for providing substantially uniform gas and liquid flow across the full width of the packing zone at the upper part of the zone.

The invention provides the use of packing pieces of a smaller size than the pieces in the central core of the packing, in an annulus having a depth of about 1–3 feet, preferably minimum of 1.5 feet from the top of the packing, extending radially inward from the tower wall to a distance ranging from about 1–3 feet, preferably, to about 10% of the tower diameter. It may, however, be advantageous to have a much deeper annulus in those towers where edge effects could be serious.

Although the quantity of the annular packing needed is small, the effective packing density and flow resistance through the annulus is significantly higher than that of the basic packing. There are, in consequence, at least, two very desirable results. First, there is a throttling of excess gas flow up the wall. Second, there is a provision of more mass transfer surface at the wall region to compensate for the lower packing density. Thus, the size of the packing pieces in the ring can be of any suitable size smaller than that of the basic packing pieces, while the dimensions of the ring can be tailored to give an overall packing density to provide a pressure drop similar to that obtained in the central packing. It will be evident to those skilled in the art that the ring is unlikely to add to significantly overall flow resistance in the tower since the heaviest loading is in the bottom. The horizontal width of the ring is at least double and, preferably, triple the normal packing piece size and at least triple the packing piece, vertically.

Thus, the smaller packing piece dimensions relative to the pieces in the bulk of the main packing zone provide increased mass transfer surface as seen by the gas and liquid fluids and, thus, enhances mass transfer efficiency. Further, the use of suitably smaller packing as, hereinbefore described, increases the gas flow resistance adjacent the tower walls so as to reduce the gas flow velocity to that in the upper part of the main packing zone.

The invention embraces also those embodiments of the invention wherein the first plurality of packing pieces comprises a mixture of pieces of various sizes, provided that the overall average packing size meets the aforesaid criteria of being smaller than the second packing piece size and that substantially uniform gas flow across the full width of the packing zone is obtained. Similarly, the second plurality of packing pieces may comprise a mixture of sizes, provided that the average size of the mass is bigger than the average size of the pieces in the annular zone.

The packing may be added and distributed across the tower packing zone to ways known and practised by the art to provide a packed tower according to the invention.

In an alternative embodiment, the smaller pieces may be retained in the annular zone within a relatively large sized meshed cylindrical container formed of metal or ceramic. Such an arrangement does not cause the vertical side of the container to constitute a solid wall to allow enhanced gas flow as seen by prior art towers at their walls.

The annulus may extend the full height of the tower packing.

In a preferred feature, the invention provides increased liquid irrigation in the region adjacent the tower wall relative to the irrigation over the central packing zone. This enhanced liquid flow compensates for liquid running down the wall and provides improved liquid-to-gas flow ratios adjacent the wall.

Accordingly, in a further aspect the invention provides a tower as hereinbefore defined further comprising means for distributing the liquid onto the first smaller packing pieces at a higher rate than onto said second larger packing pieces.

The invention offers a reduction in tower height which reduction provides significant economic benefits to users and provides enhanced scope for obtaining and maintaining optimum tower performance.

BRIEF DESCRIPTION OF THE DRAWINGS

In order that the invention may be better understood, a preferred embodiment will now be described by way of example only, with reference to the accompanying drawings, wherein.

DETAILED DESCRIPTION OF A PREFERRED EMBODIMENT

Figure 1:
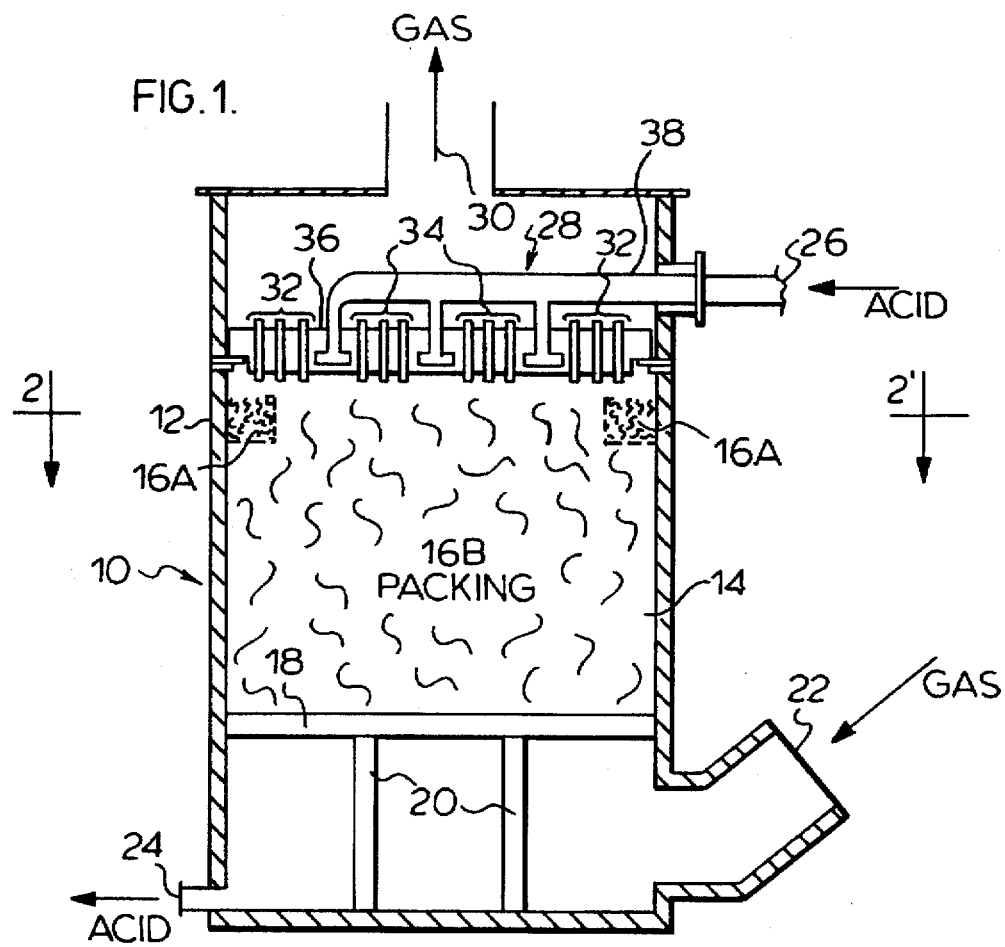
FIG. 1 represents a diagrammatic, vertical section of a packed sulfur trioxide absorption tower, according to the invention.

FIG. 1 shows generally as 10, a cylindrical sulfur trioxide absorption tower having a wall 12, a brick-lined central portion 14, containing ceramic saddle packing 16A and 16B, as hereinafter described in more detail, on a packing support 18, upheld by support piers 20. Tower 10 is of a typical size of use in sulfuric acid manufacture in having a tower diameter of 20 feet, a total height of 50 feet, and a full diameter packed bed height of 12 feet. At a lower part of tower 10, below support 18, is a sulfur trioxide gas entry port 22 and an enriched sulfuric acid exit port 24. Above the packing is a sulfuric acid entry port 26 of a distributor system shown generally as 28, and a sulfur trioxide-depleted gas exit port 30.

Figure 2:
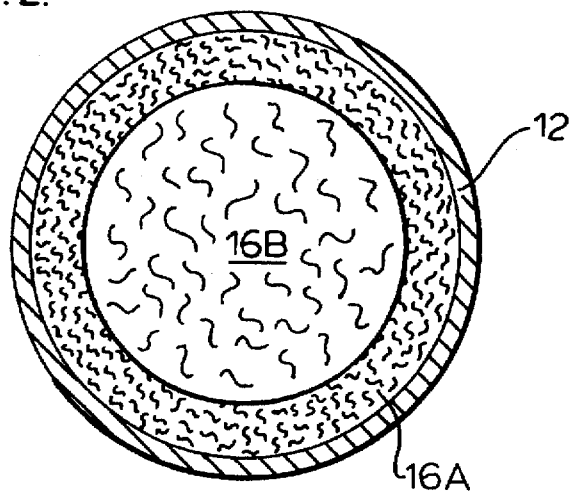
FIG. 2 represents a diagrammatic, horizontal cross-section of the sulfur trioxide absorption tower according to the invention as shown in FIG. 2, along the line 2–2'; and wherein the same numerals denote like parts.

With reference also to FIG. 2, the packing in this embodiment is constituted as an annular packing region 16A adjacent an upper part of wall 12 filled with nominal 2" ceramic saddles having dimensions of 2"×2"×4", and embedded against bulk packing volume 16B, containing nominal 3" ceramic saddles having dimensions of 3"×3"×6". The smaller saddles in 16A provide a bulk packing density of about 250 pieces/ft$^3$, surface area of 36 ft$^2$/ft$^3$ and void space of about 75%, whereas larger saddles in 16B provide a bulk packing density of about 52 pieces/ft$^3$, surface area of 28 ft$^2$/ft$^3$ and void space of about 79%.

Distributor system 28 has a first plurality of downcomers 32 disposed above annular region 16A, and a second plurality of downcomers 34 disposed above central region 16B, whereby the downcomers 32 distribute acid over region 16A at a higher rate than downcomers 34 distribute acid over region 16B.

Downcomers 32 have larger orifices than those in downcomers 34 to provide a high acid feed rate, therefrom. In an alternative embodiment, there is a higher density of downcomers 32 than the density of downcomers 34, which each has the same size of orifice to provide the higher acid feed rate over region 16A. Downcomers 32 and 34 are fed from trough 36 which receives acid from conduit 38.

The general dimensions of the ceramic saddle packing referred to in this specification is in the form used by the industry and refers to the general width×height×diameter of semi-toroidal shaped packing.

In this embodiment, sulfuric acid is sprayed onto the bulk packing 16B at a typical industry rate of 5–15 gallons per minute/feet$^2$, preferably about 10 gpm/feet$^2$, but at a higher rate over packing 16A of 7–20 gpm/feet$^2$, preferably 15 gpm/feet$^2$.

The annulus has a width of 2' projecting radially from wall 10 and a depth of 18" from the top of the packing.

In alternative embodiments according to the invention, the bulk packing dimensions may be scaled down to, for example, dimensions of 2"×2"×4", 1½"×1½"×3" and 1"×1"×2". Commensurate reduction in annular packing dimensions relative to the bulk packing size is required, with dimensions of 1½"×1½"×3" and, to a lesser extent, 1"×1"×2" dimension pieces being of value. The size of the two packing pieces may be readily selected and should, preferably, be such that the ratio of the packing bulk density of the smaller, first plurality of pieces to that of the larger, second plurality of pieces is between 2–10:1, preferably, 5:1. Packing formed of plastic, glass, stainless steel or alloys thereof, for example, may also be used.

It is well within the skill of the art to select the sizes of the larger and smaller packing pieces and the width and depth of the annulus so as to readily obtain the desired substantially constant gas flow velocity across the full packing bed at its upper part, as well as packing pieces of various shapes other than a semi-toroidal form.

Although this disclosure has described and illustrated preferred embodiment of the invention, it is to be understood that the invention is not restricted to this particular embodiment. Rather, the invention includes all embodiments which are functional or mechanical equivalence of the specific embodiment and features that have been described and illustrated.

We claim:

1. An improved packed tower for effecting the absorption of a gas into a liquid, comprising a cylindrical tower wall defining a packing zone; a plurality of packing pieces contained within said packing zone; a liquid distributor above said packing zone for distributing liquid onto said packing pieces; gas feed means below said packing pieces for feeding gas through said packing zone, the improvement wherein said plurality of packing pieces comprises a first plurality of packing pieces, of a first packing piece size, disposed within a first region of said packing zone defining an annulus adjacent at an upper part of said tower wall, and a second plurality of packing pieces of a second packing piece size greater than said first packing piece size, within a second region of said packing zone to operably provide substantially uniform gas flow across the full width of said packing zone at an upper part thereof.

2. A tower as defined in claim 1 further comprising means for distributing said liquid onto said first packing within said annulus at a higher rate than onto said second plurality of packing pieces.

3. A tower as defined in claim 1, wherein said annulus has a width of about 10% of the diameter of said packing zone.

4. A tower as defined in claim 1, wherein said annulus has a depth selected from 1–3 feet.

5. A tower as defined in claim 1, wherein the ratio of the packing bulk density of said first plurality of packing pieces, i.e. number of pieces/unit volume, to the packing bulk density of said second plurality of packing pieces is selected from 2–10:1.

\* \* \* \* \*